(12) United States Patent
Ren et al.

(10) Patent No.: US 9,629,113 B2
(45) Date of Patent: Apr. 18, 2017

(54) INFORMATION BROADCASTING AND INTERACTION SYSTEM

(71) Applicant: Yuxing Ren, Hong Kong (HK)

(72) Inventors: Yuxing Ren, Hong Kong (HK); Song He, Hong Kong (HK)

(73) Assignee: Yuxing Ren, Hong Kong (HK)

( * ) Notice: Subject to any disclaimer, the term of this patent is extended or adjusted under 35 U.S.C. 154(b) by 0 days.

(21) Appl. No.: 14/989,818

(22) Filed: Jan. 7, 2016

(65) Prior Publication Data

US 2016/0234799 A1     Aug. 11, 2016

Related U.S. Application Data

(60) Provisional application No. 62/113,543, filed on Feb. 9, 2015.

(51) Int. Cl.
*H04W 56/00* (2009.01)
*H04W 4/00* (2009.01)

(52) U.S. Cl.
CPC ......... *H04W 56/002* (2013.01); *H04W 4/006* (2013.01); *H04W 4/008* (2013.01)

(58) Field of Classification Search
CPC ...................................................... H04W 4/00
See application file for complete search history.

(56) References Cited

U.S. PATENT DOCUMENTS

| | | | |
|---|---|---|---|
| 8,781,502 B1 | 7/2014 | Middleton et al. | |
| 8,825,085 B1 | 9/2014 | Boyle et al. | |
| 9,194,955 B1* | 11/2015 | Fahrner | G01S 19/16 |
| 2009/0034432 A1* | 2/2009 | Bonta | H04W 74/02 370/255 |
| 2010/0158494 A1* | 6/2010 | King | G03B 17/00 396/56 |
| 2012/0109399 A1* | 5/2012 | Tran | H02J 3/14 700/296 |
| 2012/0295535 A1 | 11/2012 | Bradish et al. | |
| 2013/0103765 A1 | 4/2013 | Papakipos et al. | |
| 2014/0135042 A1* | 5/2014 | Buchheim | G01S 1/68 455/456.6 |

FOREIGN PATENT DOCUMENTS

| | | |
|---|---|---|
| EP | 2733502 A1 | 5/2014 |
| WO | 2014051430 A1 | 4/2014 |

* cited by examiner

*Primary Examiner* — Mohamed Kamara
*Assistant Examiner* — Thad Defauw (57) ABSTRACT

An information broadcasting and interaction system includes: a control device; a Bluetooth smart network connected with the control device, including a plurality of node devices and sense devices, and configured to operate in a mesh mode, a beacon mode, or a deep sleep mode; and a plurality of user devices connected with the Bluetooth smart network. Each node device is configured to relay control and broadcast information or feedback information between the control device and any specific device in the Bluetooth smart network, and to broadcast customized information to the user devices in a predetermined range. Each sense device is configured to collect data with a sensor integrated with the device, and relay the data to the control device.

18 Claims, 6 Drawing Sheets

INFORMATION BROADCASTING AND INTERACTION SYSTEM

CROSS-REFERENCE TO RELATED APPLICATIONS

This application claims the benefit of U.S. provisional patent application No. 62/113,543 filed on Feb. 9, 2015; the contents of which is hereby incorporated by reference.

FIELD OF THE PATENT APPLICATION

The present patent application generally relates to information technologies and more specifically to an information broadcasting and interaction system.

BACKGROUND

Local commercial and public information, e.g. price of a product, promotional ads, coupons, and public announcement, reaches end consumers through conventional printed price tags, printed ads flyers/posters, electronic display, static pages or videos, and relatively new technologies such as location based mobile APPs. These distributing and broadcasting methods serve different market sectors with established practices, yet are more or less limited for flexible adoption to meet modern precise marketing purposes, mostly technically.

Printed labels and posters are low cost, yet cost time and labor on maintenance and lack real-time refreshment capability. An electronic display serves more dynamic information and attracts attention with videos and sounds, yet it's costly in initial deployment and its location is restricted by power and network cables due to high power consumption of the LCD displays and WiFi/3G/LTE connectivity.

Recent location based mobile APPs involve positioning technologies such as GPS and iBeacon. These technologies correlate users and local information through specific APP and retrieve information from remote servers over mobile networks. While GPS is an outdoor positioning technology which could only provide rough suggestions through APPs, iBeacon's proximity based technology allows precise information pushing. The major barrier for market to adopt iBeacon is how to motivate users to download an APP and toggle on their Bluetooth. For both cases, information cannot reach users without reliable mobile networks.

Information is conventionally distributed in a one-way manner from providers to consumers. Recent technologies enable interactions through touch panels, QR code scanning and location based mobile APPs. Consumers actively acquire coupons, promotional codes and other interested information with simple clicks. iBeacon is taking off to change the marketing way to enable precise pushing and easy interaction. However, iBeacon's stand-alone and information-over-Bluetooth nature is needed to be improved for easy management, high interaction efficiency, and low consumer acceptance barriers.

SUMMARY

The present patent application is directed to an information broadcasting and interaction system. In one aspect, the system includes: a cloud server; a control device connected with the cloud server; a Bluetooth smart network connected with the control device, including a plurality of node devices and sense devices, and configured to operate in a mesh mode, a beacon mode, or a deep sleep mode; and a plurality of user devices connected with the Bluetooth smart network. Each node device is configured to relay control and broadcast information or feedback information between the control device and any specific device in the Bluetooth smart network, and to broadcast customized information to the user devices in a predetermined range. Each sense device is configured to collect data with a sensor integrated with the device, and relay the data to the control device. In the mesh mode, the node devices and the sense devices are connected with each other, the control device is configured to send specific content to a specific node device to be displayed, while each node device and each sense device are configured to send feedback information to the control device. In the beacon mode, each node device is configured to broadcast device UUID and device specific information, and show device specific information on a display. In the deep sleep mode, each node device and each sense device are controlled by a configurable clock for power saving.

In the mesh mode, internal clocks of all node devices and sense devices may be synchronized. In the mesh mode, the node devices may be configured to synchronize internal clocks of all devices in the Bluetooth smart network, and relay and configure the devices' information, which includes battery life, transmit power level, and transmit frequency.

Each node device may include one or two Bluetooth ICs supporting both mesh protocol and beacon protocols, an internal or external Micro Control Unit configured to switch the node device between the beacon mode, the mesh mode and the deep sleep mode, a memory configured to contain device specific editable information for broadcasting, and a battery configured to provide operational power for flexible deployment.

Each sense device may be configured to be switched by a configurable clock to operate in the mesh mode or in the deep sleep mode. In the mesh mode, the sense devices may be configured to synchronize internal clocks of all devices in the Bluetooth smart network, and relay and configure the devices' information, which includes battery life, transmit power level, and transmit frequency. In the mesh mode, the sense devices may be configured to send collected sensor data to the control device through an adjacent node device.

The sense device may include a Bluetooth IC supporting mesh protocol, an internal or external Micro Control Unit (MCU) configured to switch the sense device between the mesh mode and the deep sleep mode using a configurable clock, a plurality of motion sensors or environmental sensors configured to generate sensed data, a memory configured to contain the sensed data for feedback, and a battery configured to provide operational power for flexible deployment.

Each node device may be a standalone station, a bulletin board or a price tag, being connected with a display. Each node device may be a wearable accessory with a built-in display. The wearable accessory may include a base part and a plurality of buttons or sensors to enable user interactions, the base part including an individually packaged Bluetooth low energy chipset with antenna and MCU, the buttons or sensors being configured to send a user triggered message back to a central administrator via the Bluetooth smart network and wireless or Internet connections.

In another aspect, the present patent application provides an information broadcasting and interaction system including: a control device; a Bluetooth smart network connected with the control device, including a plurality of node devices and sense devices, and configured to operate in a mesh mode, a beacon mode, or a deep sleep mode; and a plurality of user devices connected with the Bluetooth smart network.

Each node device is configured to relay control and broadcast information or feedback information between the control device and any specific device in the Bluetooth smart network, and to broadcast customized information to the user devices in a predetermined range. Each sense device is configured to collect data with a sensor integrated with the device, and relay the data to the control device. In the mesh mode, the node devices and the sense devices are connected with each other, the control device is configured to send specific content to a specific node device to be displayed, while each node device and each sense device are configured to send feedback information to the control device. In the beacon mode, each node device is configured to broadcast device UUID and device specific information, and show device specific information on a display. In the deep sleep mode, each node device and each sense device are controlled by a configurable clock for power saving.

In the mesh mode, the node devices may be configured to synchronize internal clocks of all devices in the Bluetooth smart network, and relay and configure the devices' information, which includes battery life, transmit power level, and transmit frequency.

Each node device may include one or two Bluetooth ICs supporting both mesh protocol and beacon protocols, an internal or external Micro Control Unit configured to switch the node device between the beacon mode, the mesh mode and the deep sleep mode, a memory configured to contain device specific editable information for broadcasting, and a battery configured to provide operational power for flexible deployment.

In the mesh mode, the sense devices may be configured to send collected sensor data to the control device through an adjacent node device. The sense device may include a Bluetooth IC supporting mesh protocol, an internal or external Micro Control Unit (MCU) configured to switch the sense device between the mesh mode and the deep sleep mode using a configurable clock, a plurality of motion sensors or environmental sensors configured to generate sensed data, a memory configured to contain the sensed data for feedback, and a battery configured to provide operational power for flexible deployment.

Each node device may be a wearable accessory with a built-in display. The wearable accessory may include a base part and a plurality of buttons or sensors to enable user interactions, the base part including an individually packaged Bluetooth low energy chipset with antenna and MCU, the buttons or sensors being configured to send a user triggered message back to a central administrator via the Bluetooth smart network and wireless or Internet connections.

In yet another aspect, the present patent application provides an information broadcasting and interaction system including: a control device; a Bluetooth smart network connected with the control device, including a plurality of node devices and sense devices, and configured to operate in a mesh mode, a beacon mode, or a deep sleep mode; and a plurality of user devices connected with the Bluetooth smart network. Each node device is configured to relay control and broadcast information or feedback information between the control device and any specific device in the Bluetooth smart network, and to broadcast customized information to the user devices in a predetermined range. Each sense device is configured to collect data with a sensor integrated with the device, and relay the data to the control device.

In the mesh mode, the node devices and the sense devices may be connected with each other, the control device may be configured to send specific content to a specific node device to be displayed, while each node device and each sense device may be configured to send feedback information to the control device.

In the beacon mode, each node device may be configured to broadcast device UUID and device specific information, and show device specific information on a display. In the deep sleep mode, each node device and each sense device may be controlled by a configurable clock for power saving.

Each node device may include one or two Bluetooth ICs supporting both mesh protocol and beacon protocols, an internal or external Micro Control Unit configured to switch the node device between the beacon mode, the mesh mode and the deep sleep mode, a memory configured to contain device specific editable information for broadcasting, and a battery configured to provide operational power for flexible deployment.

DETAILED DESCRIPTION

Reference will now be made in detail to a preferred embodiment of the information broadcasting and interaction system disclosed in the present patent application, examples of which are also provided in the following description. Exemplary embodiments of the information broadcasting and interaction system disclosed in the present patent application are described in detail, although it will be apparent to those skilled in the relevant art that some features that are not particularly important to an understanding of the information broadcasting and interaction system may not be shown for the sake of clarity.

Furthermore, it should be understood that the information broadcasting and interaction system disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
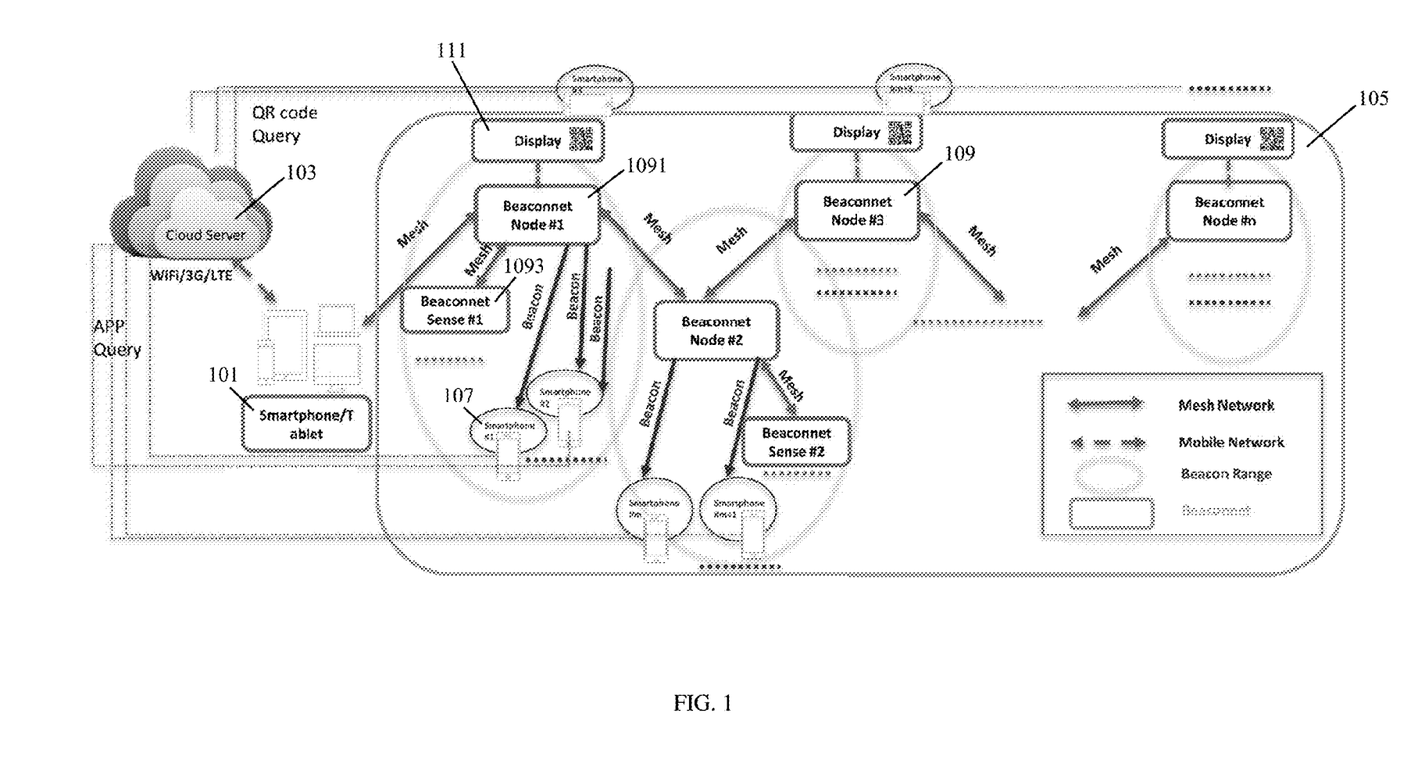
FIG. 1 illustrates an information broadcasting and interaction system in accordance with an embodiment of the present patent application.

FIG. 1 illustrates an information broadcasting and interaction system in accordance with an embodiment of the present patent application. Referring to FIG. 1, the Bluetooth connected broadcasting and interaction system includes a central control device 101, which can be a smartphone or tablet, connected with a cloud server 103, a Bluetooth smart network 105, namely the "Beaconnet", and a plurality of consumers' smartphones 107, which may also be referred to as the user devices. The Beaconnet 105 includes a plurality of meshed Bluetooth smart devices 109, namely the "Beaconnet devices". The user devices 107, which may be smartphones or tablets, are seamlessly connected to the Beaconnet to send or receive information through Bluetooth.

The Beaconnet devices 109 include two derived types, a Beaconnet Node device 1091 or a Beaconnet Sense device 1093. Each Beaconnet Node device 1091 is configured to relay control and broadcast information or feedback information between the control device 101 and any specific Beaconnet device 109. The Beaconnet Node device 1091 is further configured to broadcast customized information to the user devices 107 within the Beaconnet range, and to show the information directly on a display 111 that is optionally plugged to the Beaconnet Node device 1091. Each Beaconnet Sense device 1093 is configured to collect data with a sensor integrated with the device, and relay the data to the control device 101.

The user devices 107 within the Beaconnet service range are configured to listen to the adjacent Beaconnet Node devices 1091 and retrieve information and UUID directly through Bluetooth connection. A user can also scan a QR code containing the same information which is being broadcasted by the Beaconnet Node device 1091, on the display 111 connected to the Beaconnet Node device 1091.

Figure 2:
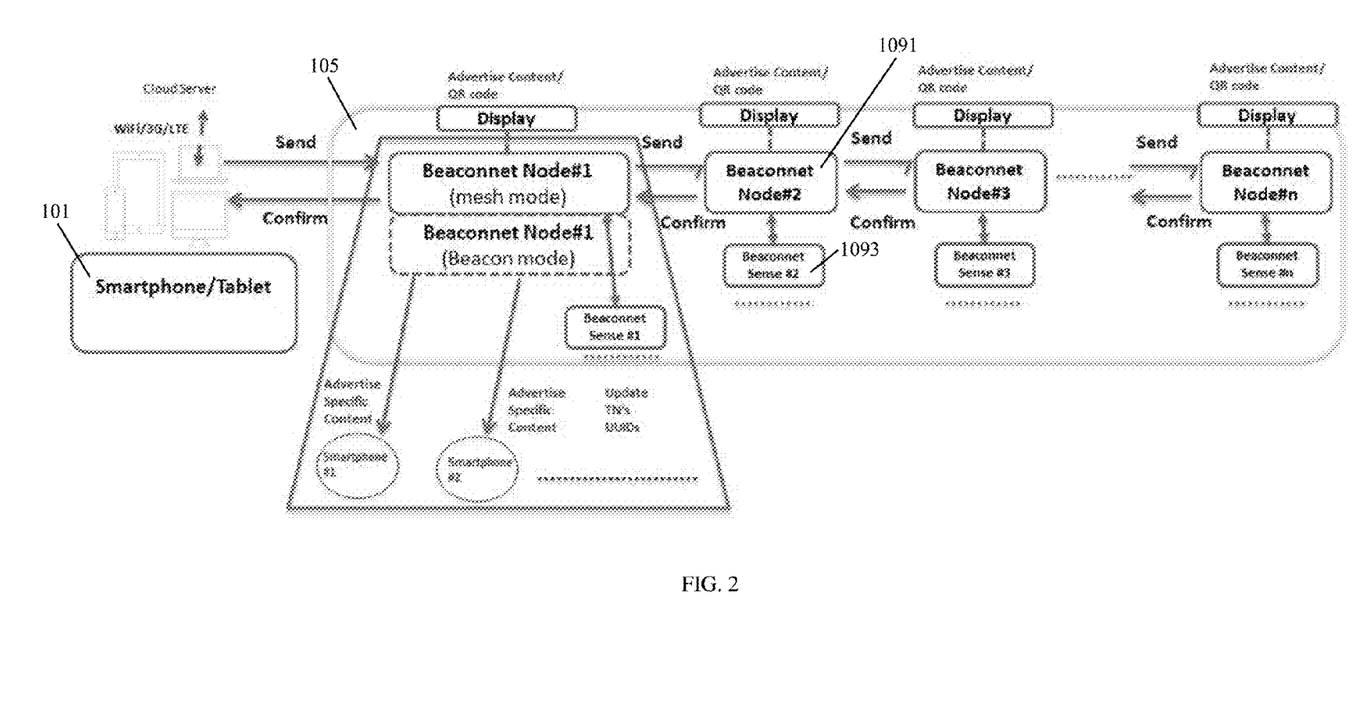
FIG. 2 illustrates operation of the information broadcasting and interaction system depicted in FIG. 1.

FIG. 2 illustrates operation of the information broadcasting and interaction system depicted in FIG. 1. Referring to FIG. 2, the Beaconnet 105 is configured to operate in three modes: mesh mode, beacon mode and deep sleep mode. In mesh mode, all Beaconnet devices, including the Beaconnet Node devices 1091 and the Beaconnet Sense devices 1093, are connected. The data communications between Beaconnet Node devices 1091 are managed. The control device 101 is configured to send specific content to a specific Beaconnet Node device to be advertised and displayed. Each Beaconnet Node device 1091 and each Beaconnet Sense device 1093 are configured to send feedback information to the control device 101. All Beaconnet devices' internal clocks are synchronized. Beaconnet devices' information such as battery life, transmit power level/frequency etc. is managed and configured. The control device 101 runs a management system to manage the Beaconnet. In beacon mode, each Beaconnet Node device 1091 is configured to broadcast device UUID and device specific information, and show device specific information on a display. In deep sleep mode, each Beaconnet Node device 1091 and each Beaconnet Sense device 1093 are controlled by a configurable clock for power saving.

Figure 3:
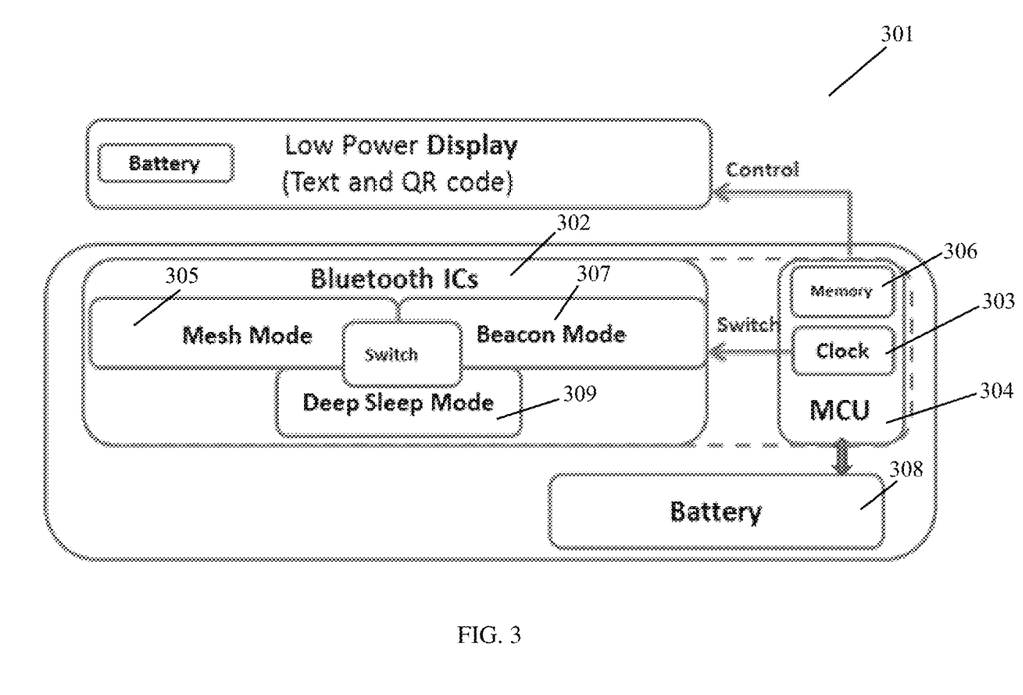
FIG. 3 is a block diagram of a Beaconnet Node device in the information broadcasting and interaction system depicted in FIG. 1.

FIG. 3 is a block diagram of a Beaconnet Node device in the information broadcasting and interaction system depicted in FIG. 1. Referring to FIG. 3, the Beaconnet Node device 301 works in three modes which are switched by a configurable clock 303. When switched to the mesh mode 305, the Beaconnet Node devices 301 form network connections between each other. In the mesh mode, the Beaconnet Node devices 301 are configured to relay data between the Beaconnet devices and receive specific content to broadcast and display. The Beaconnet Node devices 301 are configured to synchronize all Beaconnet devices' internal clocks, and relay and configure Beaconnet devices' information such as battery life, transmit power level/frequency etc. In the beacon mode 307, the Beaconnet Node devices 301 are configured to broadcast the device UUID and specific information. The Beaconnet Node devices 301 are further configured to switch to the deep sleep mode 309 to save power.

Referring to FIG. 3, each Beaconnet Node device 301 includes one or two Bluetooth ICs 302 supporting both mesh protocol and beacon protocols, an internal or external Micro Control Unit (MCU) 304 configured to switch the Beaconnet Node device 301 between the beacon mode 307, the mesh mode 305 and the deep sleep mode 309 using the configurable clock 303, a memory 306 configured to contain device specific editable information for broadcasting, and a battery 308 configured to provide operational power for flexible deployment.

Figure 4:
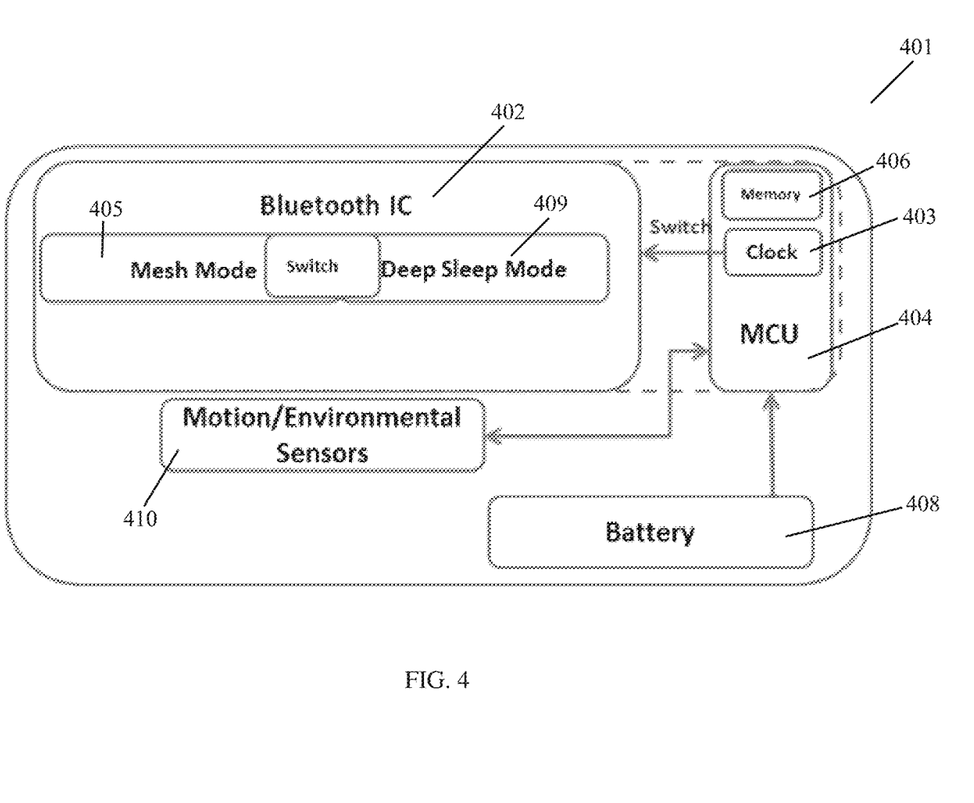
FIG. 4 is a block diagram of a Beaconnet Sense device in the information broadcasting and interaction system depicted in FIG. 1.

FIG. 4 is a block diagram of a Beaconnet Sense device in the information broadcasting and interaction system depicted in FIG. 1. Referring to FIG. 4, the Beaconnet Sense device 401 is configured to operate in two modes which are switched by a configurable clock 403. When switched to the mesh mode 405, the Beaconnet sense devices 401 form network connections between each other. The Beaconnet sense devices 401 are configured to synchronize all Beaconnet devices' internal clocks, and relay and configure Beaconnet devices' information such as battery life, transmit power level/frequency etc. The Beaconnet sense devices 401 are configured to send collected sensor data to the control device 101 through an adjacent Beaconnet Node device and the mesh network. The Beaconnet sense devices 401 are further configured to switch to the deep sleep mode 409 to save power.

Referring to FIG. 4, the Beaconnet sense device 401 includes a Bluetooth IC 402 supporting mesh protocol, an internal or external Micro Control Unit (MCU) 404 configured to switch the Beaconnet sense device 401 between the mesh mode 405 and the deep sleep mode 409 using the configurable clock 403, a memory 406 configured to contain sensed data for feedback, and a battery 408 configured to provide operational power for flexible deployment. In this embodiment, the Beaconnet sense device 401 may further include a plurality of motion sensors or environmental sensors 410 configured to generate the sensed data.

Figure 5:
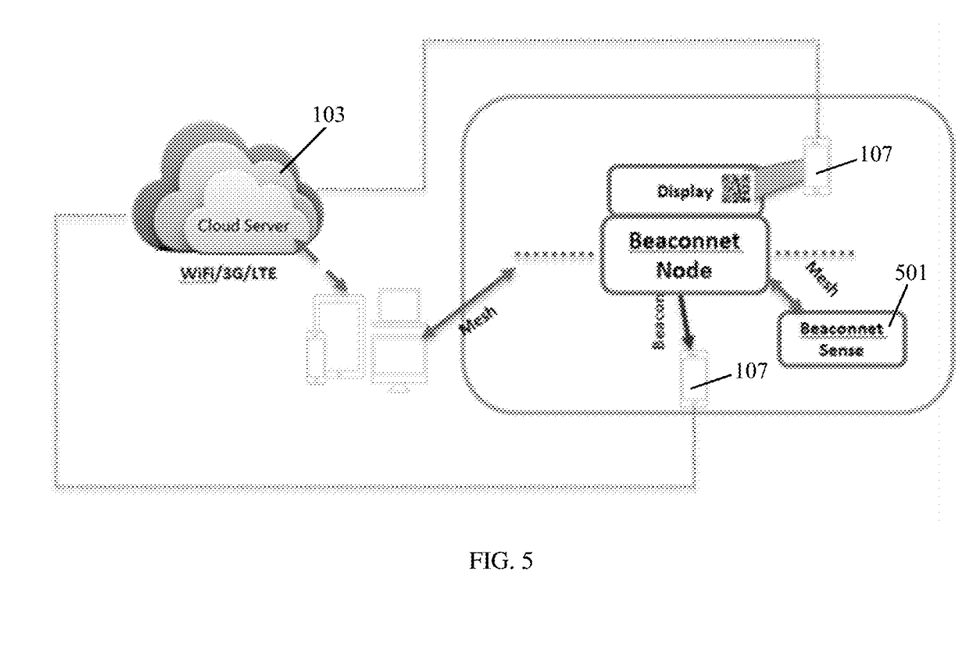
FIG. 5 illustrates user interaction of the information broadcasting and interaction system depicted in FIG. 1.

FIG. 5 illustrates user interaction of the information broadcasting and interaction system depicted in FIG. 1. Referring to FIG. 5, consumer or user interaction with the system is in both active and passive ways. In the active way, the user device 107 queries the cloud server 103 through a scanned QR code link or a Beacon enabled APP link, for more detailed information. In the passive way, the user's picking/putting actions etc. are collected by the Beaconnet sense device 501 and relayed back to the could server 103.

Figure 6:
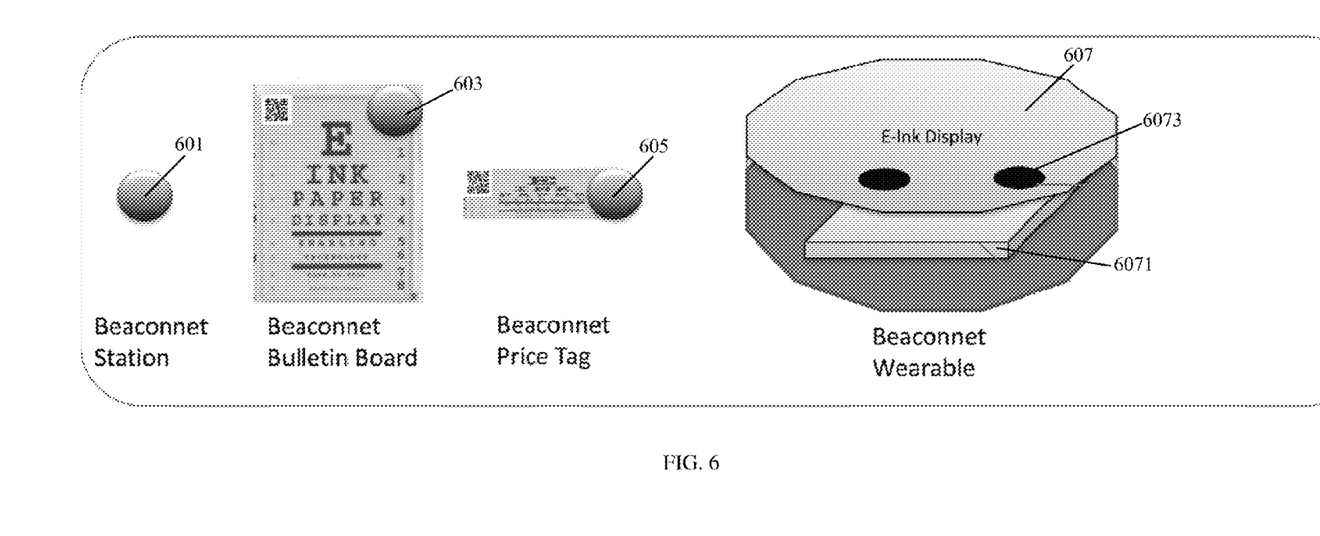
FIG. 6 illustrates an information broadcasting and interaction system in accordance with another embodiment of the present patent application.

FIG. 6 illustrates an information broadcasting and interaction system in accordance with another embodiment of the present patent application. Referring to FIG. 6, the Beaconnet Node device can be a standalone station 601, a bulletin board 603 or a price tag 605, being connected with an optional display. The Beaconnet Node device may also be a wearable accessory 607 with a built-in display. The wearable accessory 607 includes a Beaconnet base part 6071 and a plurality of buttons or sensors 6073 to enable more user interactions. The Beaconnet base part 6071 includes an individually packaged small form factor BLE (Bluetooth low energy) chipset with antenna and MCU. The buttons or sensors 6073 are configured to send a user triggered message back to a central administrator at the cloud via Beaconnet and wireless/Internet connections.

The information broadcasting and interaction system provided by the above embodiments can be applied to a wide range of application scenarios. Public services can utilize the system as a central controlled message bulletin board to manage multiple notices at different locations. Supermarkets and shopping malls can use Beaconnet price tags to refresh the price information in real-time instead of printing and replacing the paper labels manually. Parents and teachers can use a smartphone to track and push messages to kids for safety and simple communications. As a consumer, it's easy to notice the price or message from the Beaconnet node display without downloading specific APPs and turning on the Bluetooth. This reduces the application barriers that iBeacon is facing. Consumers can also interact with the system by pressing the buttons, scanning the QR code, and further downloading APPs to utilize the Beacon related information if they want. The Beaconnet sense devices can help to collect consumer's behavioral data when attached to products, where big data analysis for marketing purposes is enabled.

The information broadcasting and interaction system provided by the above embodiments utilizes state-of-the-art Bluetooth technologies and low power display to address the broadcasting and interaction problems. Low energy Bluetooth Beacon-like devices are networked using meshing technology to enable real-time refreshable information at specific locations, which can push short info and UUID over Bluetooth. The system can ease the data and device maintenance, provide precise and flexible info pushing options, and be less dependent on mobile networks. Low power Bluetooth technology enables anywhere deployment of the system, powered by battery.

To directly show text and graphics to consumers rather than forcing consumers to turn on Bluetooth and download an APP at an initial stage, a plug-and-play low power display is bundled with the networked Beacon-like device. Real-time refreshable information and QR code, from a control center, are updated and shown on the display for consumer's easy access and active response.

A smartphone/tablet (such as the control device 101 in FIG. 1) with specific management APP is locally connected to the Beacon network through any adjacent device using Bluetooth. Management personnel can retrieve batch data from a cloud server or directly input device specific data with the APP and such data are pushed to any networked beacon-like device at any time.

Interaction between information provider and consumers is achieved by clicking links from scanned QR code or iBeacon messages. To further acquire consumer behavioral data, a sensor equipped Beacon-like device collects motion and environment data and transmits the data through the Bluetooth network to a central smartphone/tablet or cloud for analysis.

While the present patent application has been shown and described with particular references to a number of embodiments thereof, it should be noted that various other changes or modifications may be made without departing from the scope of the present invention.

What is claimed is:

1. An information broadcasting and interaction system comprising:
   a cloud server;
   a control device connected with the cloud server;
   a Bluetooth smart network connected with the control device, comprising a plurality of node devices and a plurality of sense devices, wherein each node device is configured to operate in a mesh mode, a beacon mode and a deep sleep mode, and wherein each sense device is configured to operate in the mesh mode and the deep sleep mode; and
   a plurality of user devices connected with the Bluetooth smart network; wherein:
   each node device is configured to relay control and broadcast information or feedback information between the control device and any specific device in the Bluetooth smart network, and to broadcast customized information to the user devices in a predetermined range, wherein the customized information to be broadcasted for a user device located in a specific location is refreshed in a real time, and wherein the customized information broadcasted is easily accessible to users, of the user devices, by scanning a OR-code containing the customized information and thereby capturing active responses of the users;
   each sense device is configured to collect sensor data with a sensor integrated with the device, and relay the sensor data to the control device, wherein the sensor data indicates behavioral data of the users captured based on motion and environmental data associated to the users, and wherein the behavioral data is further transmitted to the cloud server for facilitating big data analysis of the behavioral data in order to derive market insights;
   in the mesh mode, the plurality of node devices and the plurality of sense devices are connected with each other, the control device is configured to send specific content to a specific node device to be displayed, each node device and each sense device are configured to send feedback information to the control device, and wherein each sense device is configured to send the sensor data to the control device via an adjacent node device;
   in the beacon mode, each node device is configured to broadcast device UUID and device specific information, and show device specific information on a display, and wherein the device specific information indicates the customized information to be displayed via the QR-code present on the display of each node device, and wherein the customized information comprises at least one of real time pricing information associated to supermarkets or shopping malls within the location of the user and one or more push messages communicated between a kid and a teacher or a parent for safe tracking of the kid; and
   in the deep sleep mode, each node device and each sense device are controlled by a configurable clock for power saving.

2. The information broadcasting and interaction system of claim 1, wherein in the mesh mode, internal clocks of all node devices and sense devices are synchronized.

3. The information broadcasting and interaction system of claim 1, wherein in the mesh mode, the node devices are configured to synchronize internal clocks of all devices in the Bluetooth smart network, and relay and configure the devices' information, which comprises battery life, transmit power level, and transmit frequency.

4. The information broadcasting and interaction system of claim 1, wherein each node device comprises one or two Bluetooth ICs supporting both mesh protocol and beacon protocols, an internal or external Micro Control Unit configured to switch the node device between the beacon mode, the mesh mode and the deep sleep mode, a memory configured to contain device specific editable information for broadcasting, and a battery configured to provide operational power for flexible deployment.

5. The information broadcasting and interaction system of claim 1, wherein each sense device is configured to be switched by a configurable clock to operate in the mesh mode and in the deep sleep mode.

6. The information broadcasting and interaction system of claim 1, wherein the sense device comprises a Bluetooth IC supporting mesh protocol, an internal or external Micro Control Unit (MCU) configured to switch the sense device between the mesh mode and the deep sleep mode using a configurable clock, a plurality of motion sensors or environmental sensors configured to capture the motion and the environmental data associated to the users, a memory configured to contain the sensed data for feedback, and a battery configured to provide operational power for flexible deployment.

7. The information broadcasting and interaction system of claim 1, wherein each node device is a standalone station, a bulletin board or a price tag, being connected with a display.

8. The information broadcasting and interaction system of claim 1, wherein each node device is a wearable accessory with a built-in display, the wearable accessory comprising a base part and a plurality of buttons or sensors to enable user interactions, the base part comprising an individually packaged Bluetooth low energy chipset with antenna and MCU, the buttons or sensors being configured to send a user triggered message back to a central administrator via the Bluetooth smart network and wireless or Internet connections.

9. The information broadcasting and interaction system of claim 5, wherein in the mesh mode, the sense devices are configured to synchronize internal clocks of all devices in the Bluetooth smart network, and relay and configure the devices' information, which comprises battery life, transmit power level, and transmit frequency.

10. An information broadcasting and interaction system comprising:
 a control device;
 a Bluetooth smart network connected with the control device, comprising a plurality of node devices and a plurality of sense devices, wherein each node device is configured to operate in a mesh mode, a beacon mode and a deep sleep mode, and wherein each sense device is configured to operate in the mesh mode and the deep sleep mode; and
 a plurality of user devices connected with the Bluetooth smart network; wherein:
 each node device is configured to relay control and broadcast information or feedback information between the control device and any specific device in the Bluetooth smart network, and to broadcast customized information to the user devices in a predetermined range, wherein the customized information to be broadcasted for a user device located in a specific location is refreshed in a real time, and wherein the customized information broadcasted is easily accessible to users, of the user devices, by scanning a OR-code containing the customized information and thereby capturing active responses of the users;
 each sense device is configured to collect sensor data with a sensor integrated with the device, and relay the sensor data to the control device, wherein the sensor data indicates behavioral data of the users captured based on motion and environmental data associated to the users, and wherein the behavioral data is further transmitted to the cloud server for facilitating big data analysis of the behavioral data in order to derive market insights;
 in the mesh mode, the plurality of node devices and the plurality of sense devices are connected with each other, the control device is configured to send specific content to a specific node device to be displayed, each node device and each sense device are configured to send feedback information to the control device, and wherein each sense device is configured to send the sensor data to the control device via an adjacent node device;
 in the beacon mode, each node device is configured to broadcast device UUID and device specific information, and show device specific information on a display, and wherein the device specific information indicates the customized information to be displayed via the QR-code present on the display of each node device, and wherein the customized information comprises at least one of real time pricing information associated to supermarkets or shopping malls within the location of the user and one or more push messages communicated between a kid and a teacher or a parent for safe tracking of the kid; and
 in the deep sleep mode, each node device and each sense device are controlled by a configurable clock for power saving.

11. The information broadcasting and interaction system of claim 10, wherein in the mesh mode, the node devices are configured to synchronize internal clocks of all devices in the Bluetooth smart network, and relay and configure the devices' information, which comprises battery life, transmit power level, and transmit frequency.

12. The information broadcasting and interaction system of claim 10, wherein each node device comprises one or two Bluetooth ICs supporting both mesh protocol and beacon protocols, an internal or external Micro Control Unit configured to switch the node device between the beacon mode, the mesh mode and the deep sleep mode, a memory configured to contain device specific editable information for broadcasting, and a battery configured to provide operational power for flexible deployment.

13. The information broadcasting and interaction system of claim 10, wherein the sense device comprises a Bluetooth IC supporting mesh protocol, an internal or external Micro Control Unit (MCU) configured to switch the sense device between the mesh mode and the deep sleep mode using a configurable clock, a plurality of motion sensors or environmental sensors configured to capture the motion and the environmental data associated to the users, a memory configured to contain the sensed data for feedback, and a battery configured to provide operational power for flexible deployment.

14. The information broadcasting and interaction system of claim 10, wherein each node device is a wearable accessory with a built-in display, the wearable accessory comprising a base part and a plurality of buttons or sensors to enable user interactions, the base part comprising an individually packaged Bluetooth low energy chipset with antenna and MCU, the buttons or sensors being configured to send a user triggered message back to a central administrator via the Bluetooth smart network and wireless or Internet connections.

15. An information broadcasting and interaction system comprising:
 a control device;
 a Bluetooth smart network connected with the control device, comprising a plurality of node devices and a plurality of sense devices, wherein each node device is configured to operate in a mesh mode, a beacon mode and a deep sleep mode, and wherein each sense device is configured to operate in the mesh mode and the deep sleep mode; and
 a plurality of user devices connected with the Bluetooth smart network; wherein:

each node device is configured to relay control and broadcast information or feedback information between the control device and any specific device in the Bluetooth smart network, and to broadcast customized information to the user devices in a predetermined range, wherein the customized information to be broadcasted for a user device located in a specific location is refreshed in a real time, and wherein the customized information broadcasted is easily accessible to users, of the user devices, by scanning a QR-code containing the customized information and thereby capturing active responses of the users; and each sense device is configured to collect sensor data with a sensor integrated with the device, and relay the sensor data to the control device, wherein the sensor data indicates behavioral data of the users captured based on motion and environmental data associated to the users, and wherein the behavioral data is further transmitted to the cloud server for facilitating big data analysis of the behavioral data in order to derive market insights, wherein: in the beacon mode, each node device is configured to broadcast device UUID and device specific information, and show device specific information on a display, and wherein the device specific information indicates the customized information to be displayed via the OR-code present on the display of each node device, and wherein the customized information comprises at least one of real time pricing information associated to supermarkets or shopping malls within the location of the user and one or more push messages communicated between a kid and a teacher or a parent for safe tracking of the kid.

16. The information broadcasting and interaction system of claim 15, wherein in the mesh mode, the plurality of node devices and the plurality of sense devices are connected with each other, the control device is configured to send specific content to a specific node device to be displayed, while each node device and each sense device are configured to send feedback information to the control device, and wherein each sense device is configured to send the sensor data to the control device via an adjacent node device.

17. The information broadcasting and interaction system of claim 15, wherein in the deep sleep mode, each node device and each sense device are controlled by a configurable clock for power saving.

18. The information broadcasting and interaction system of claim 15, wherein each node device comprises one or two Bluetooth ICs supporting both mesh protocol and beacon protocols, an internal or external Micro Control Unit configured to switch the node device between the beacon mode, the mesh mode and the deep sleep mode, a memory configured to contain device specific editable information for broadcasting, and a battery configured to provide operational power for flexible deployment.

* * * * *